United States Patent [19]

Ollila

[11] Patent Number: 5,741,391
[45] Date of Patent: Apr. 21, 1998

[54] METHOD FOR THE PREPARATION OF BOARD

[75] Inventor: Timo Ollila, Joensuu, Finland

[73] Assignee: Schauman Wood Oy, Savonlinna, Finland

[21] Appl. No.: 609,486

[22] Filed: Mar. 1, 1996

Related U.S. Application Data

[63] Continuation of Ser. No. 331,748, Oct. 31, 1994, abandoned.
[51] Int. Cl.⁶ ..................................................... B32B 31/00
[52] U.S. Cl. .......................... 156/283; 156/182; 156/288; 156/297; 156/311; 156/325
[58] Field of Search .................... 428/323, 339; 156/282, 297, 321, 325, 182, 288, 311, 352, 283

[56] References Cited

U.S. PATENT DOCUMENTS

| | | |
|---|---|---|
| 3,144,376 | 8/1964 | Plumberg et al. . |
| 3,480,497 | 11/1969 | Morse et al. ............................ 156/155 |
| 3,581,779 | 6/1971 | Sylvia, Jr. ............................ 138/141 |
| 3,922,425 | 11/1975 | Plumberg . |
| 4,204,987 | 5/1980 | Streets et al. ........................... 260/29.2 |
| 5,286,545 | 2/1994 | Simmons, Jr. . |

*Primary Examiner*—Merrick Dixon
*Attorney, Agent, or Firm*—Adduci, Mastriani & Schaumburg, L.L.P.

[57] ABSTRACT

A method of making a board in which a thermoplastic layer is joined to the surface of a wooden board includes the steps of gluing a particle layer onto the surface of a wooden board, covering the particle layer with a thermoplastic, melting the thermoplastic and cooling the melted thermoplastic to form the thermoplastic layer. The particles in the particle layer are wood-based particles such as wood fiber, dust, chips, and paper chaff and are used in a quantity of from 10 to 500 g/sq.m.

9 Claims, No Drawings

METHOD FOR THE PREPARATION OF BOARD

This application is a continuation of application Ser. No. 08/331,748 filed Oct. 31, 1994 now abandoned.

FIELD OF TECHNOLOGY

The invention concerns a board-making method, wherein a wooden board is coated with a thermoplastic layer.

BACKGROUND OF THE INVENTION

It is a known practice to coat wooden boards with a thermoplastic layer so that the melted plastic layer is allowed when cooling to attach directly to the board surface. However, the poor adhesion of plastic poses a problem.

DESCRIPTION OF THE INVENTION
General description

A board-making method in which a thermoplastic layer is joined to the surface of a wooden board includes gluing a particle layer onto the surface of the wooden board, covering the particle layer with a thermoplastic, melting the thermoplastic and cooling the melted thermoplastic to form the thermoplastic layer.

It is essential according to the method that a particle layer is attached to the surface of the wooden board with glue and a thermoplastic layer is melted on top of the particle layer and it will adhere to the particles when cooling. In this way the plastic will adhere very strongly to the surface.

The board is suitable for use in structures where a good moisture-resistance is required. For example, various structures in production premises of the food industry and concrete moulds are such structures.

DETAILED DESCRIPTION

A wooden board can be plywood or veneer, a chipboard, fibreboard or massive wood. Any kind of wood can be used, such as spruce, birch or pine.

The particles to be glued are preferably a wood-based particle, such as woodfibre, dust, chip or paper chaff. The wood-based particles may be mixed with, for example, synthetic plastic, especially the same plastic as the one melted onto the surface. A suitable particle quantity is 10–500 g/sq.m., preferably about 100 g/sq.m. The particles may also be, for example, a nonwoven fabric or a chopped strand mat.

The glue may be, for example, isocyanate, polyurethane or phenol or some other resin glue. MDI or FF glues are especially suitable for use. A suitable glue quantity is 10–300 g/sq.m., preferably about 50 g/sq.m.

The thermoplastic is preferably a polyolefine, such as polyethylene. Naturally, it may also be a mixture. A suitable quantity is 100–5000 g/sq.m., preferably 1000–2000 g/sq.m. The plastic is preferably a granulate or a similar material. Recycled plastic may also be used.

The method can be implemented in such a way that the glue is first spread out on the surface of the wooden board and particles are scattered on top of it and then a thermoplastic, whereupon the workpiece is put into a hot-press at such a high temperature that the thermoplastic will melt. The glue hereby binds the particles onto the surface of the wooden board and the melting thermoplastic surrounds the particles. Finally, the board is allowed to cool, whereby the hardening plastic adheres strongly to the particles. Cooling may take place, for example, in a cold-press or in a pile together with releasing sheets. Alternatively, the plastic may be melted before pressing, for example, using an IR heater. This has the advantage that moisture is allowed to evaporate freely during heating. It is more difficult to control this process in a hot-press.

The wooden board can also be coated on both sides at the same time. When a fixed or removable frame is also used in the board press the board edges are also coated.

Adhesion of the coating can be further improved by treating the surface of the wooden board mechanically before gluing. The surface can be treated i.a. by roughening (for example, by wire brushing a wet wooden surface), perforating, grooving or serrating. The surface is preferably treated by planing across the grain.

EXAMPLE 1

MDI glue was spread out in a quantity of 50 g/sq.m. onto the surface of softwood plywood (thickness 12 mm). Pinewood fibre in a quantity of 200 g/sq.m. and made with a Bauer grinder was spread out on top of the glue. Recycled polyethylene granulate in a quantity of 2000 g/sq.m. was scattered on top of the fibre layer. The coated plywood was compressed under a pressure of 1.2 N/sq.mm. at a temperature of 170° C. for 8 minutes and it was cooled immediately in a cold-press under the same pressure for 2 minutes.

In a cross-drawing test (BFU 20) the boards were broken away from the basic board.

The coating adhered well after a boiling test (BFU100).

EXAMPLE 2

A mixture of MDI glue and phenol resin (50%) was spread out in a quantity of 100 g/sq.m. onto the surface of softwood plywood (thickness 12 mm). The mixture contained 25% of MDI or 75% of the resin solution. Fine chips in a quantity of 100 g/sq.m. and made with a Pallman grinder were scattered onto the glued surface. Recycled polyethylene granulate was scattered onto the chip layer in a quantity of 1000 g/sq.m. The coated plywood was compressed under a pressure of 1.2 N/sq.mm. and at a temperature of 170° C. for 6 minutes and it was cooled immediately in a cold-press under the same pressure for 2 minutes.

The boards broke away from the basic board in a cross-drawing test (BFU 20).

The coating adhered well after a boiling test (BFU100).

EXAMPLE 3

A mixture of MDI glue and phenol resin (50%) was spread out in a quantity of 50 g/sq.m. onto the surface of softwood plywood (thickness 12 mm). The same mixture was also spread out onto the board edges. The mixture contained 25% of MDI or 75% of the resin solution. Fine chips in a quantity of 100 g/sq.m. and made with a Pallman grinder were scattered on top of the glued surface. The same chips were also scattered onto the edges of the board. Recycled polyethylene granulate in a quantity of 2000 g/sq.m. was scattered on top of the chip layer. The coated plywood was compressed under a pressure of 1.2 N/sq.mm. and at a temperature of 170° C. for 6 minutes and it was cooled immediately in a cold-press under the same pressure for 2 minutes. When being compressed, the board was in a metal frame which was wider by 2 mm at each edge. In this way the melted plastic entered between the board and the frame and the edges of the board were also coated.

The boards broke away from the basic board in a cross-drawing test (BFU 20).

The coating adhered well after a boiling test (BFU100).

I claim:

1. A method of making a wooden board having a thermoplastic layer joined to a surface of said board, said method comprising the steps of:
   applying a glue on the surface of said board;
   spreading particles on the glued surface;
   spreading granules of a thermoplastic on said particles;
   melting the thermoplastic granules to form a thermoplastic layer in contact with the particles; and
   cooling the thermoplastic layer.

2. Method as defined in claim 1, wherein the wooden board, the particles and the thermoplastic are compressed during the melting or cooling of the thermoplastic and a glue is used which will bind the particles to the wooden board during melting or cooling of the thermoplastic.

3. Method as defined in claim 1, wherein the particles are wood-based particles selected from the group consisting of wood fibre, dust, chips and paper chaff, and are used in a quantity of from 10 to 500 g/sq.m.

4. Method as defined in claim 1, wherein the thermoplastic is a polyolefin and is used in a quantity of from 100 to 5000 g/sq.m.

5. Method as defined in claim 1, wherein the glue is selected from the group consisting of an isocyanate, a polyurethane and a phenol glue and is used in a quantity of from 10 to 300 g/sq.m.

6. Method as defined in claim 1, wherein the wooden board is selected from the group consisting of plywood, veneer, chipboard, fibreboard and solid wood.

7. Method as defined in claim 1, wherein before the step of applying the glue, the surface of the wooden board is subjected to roughening, perforating, grooving or serrating in order to increase the adhesion of the particles and the thermoplastic layer.

8. Method according to claim 1, wherein the steps of spreading particles on the glued surface and spreading granules of a thermoplastic on said particles are performed simultaneously.

9. The method as defined in claim 1, wherein the particles comprise a non-woven fabric or a chopped strand mat.

* * * * *